(12) United States Patent
Barnett et al.

(10) Patent No.: US 10,463,116 B2
(45) Date of Patent: Nov. 5, 2019

(54) EXPANDABLE SOCKET ACCESSORY

(71) Applicant: POPSOCKETS LLC, Boulder, CO (US)

(72) Inventors: David B. Barnett, Boulder, CO (US);
Greg Adelman, Boulder, CO (US);
Michael J. Kory, Boulder, CO (US);
Randy Yang Chiang, Boulder, CO (US); Altan Nahum, Boulder, CO (US); David F. Willson, Boulder, CO (US); Vanessa Cantoli Alves, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

(21) Appl. No.: 15/864,509

(22) Filed: Jan. 8, 2018

(65) Prior Publication Data

US 2019/0208871 A1   Jul. 11, 2019

(51) Int. Cl.
*A45F 5/10* (2006.01)
*A44B 99/00* (2010.01)
(Continued)

(52) U.S. Cl.
CPC .......... *A44B 99/005* (2013.01); *G06F 1/1632* (2013.01); *H04M 1/0283* (2013.01); *H04M 1/04* (2013.01)

(58) Field of Classification Search
CPC ........ A45F 2005/026; A45F 2200/0516; A45F 5/021; A45F 2005/025; H04M 1/0254; H04M 1/0279
See application file for complete search history.

(56) References Cited

U.S. PATENT DOCUMENTS 3,298,071 A    1/1967   Flora
3,758,198 A    9/1973   Kanie et al.
(Continued)

FOREIGN PATENT DOCUMENTS

EP    2760139 A1    7/2014
GB    2508622 A     6/2014
(Continued)

OTHER PUBLICATIONS

International Search Report and Written Opinion for International Application No. PCT/US2018/041218, dated Aug. 23, 2018.
(Continued)

*Primary Examiner* — Bradley Duckworth
(74) *Attorney, Agent, or Firm* — Marshall, Gerstein & Borun LLP

(57) ABSTRACT

An expandable socket accessory includes a body movable between an expanded configuration and a collapsed configuration. The body includes a first end and a second end. A platform is removably connected to the second end of the body. The platform includes a top surface, a bottom surface, and a collar extending axially away from the top surface. The collar defines a side opening and an inner radial surface. The side opening is sized to slidably receive at least a portion of the second end of the body. The inner radial surface of the platform cooperates with and retains the second end of the body in connection with the platform.

17 Claims, 8 Drawing Sheets

(51) Int. Cl.
*G06F 1/16* (2006.01)
*H04M 1/02* (2006.01)
*H04M 1/04* (2006.01)

(56) References Cited

U.S. PATENT DOCUMENTS

| | | | |
|---|---|---|---|
| 3,796,984 A | 3/1974 | Selinko | |
| 4,326,102 A | 4/1982 | Culp et al. | |
| 4,392,279 A | 7/1983 | Schwager | |
| 4,912,609 A | 3/1990 | Gillette | |
| 4,955,493 A | 9/1990 | Touzani | |
| 5,233,650 A | 8/1993 | Chan | |
| 5,610,979 A | 3/1997 | Yu | |
| 5,957,421 A * | 9/1999 | Barbour | A45F 5/02 224/197 |
| 5,979,724 A | 11/1999 | Loewenthal, Jr. et al. | |
| 6,166,695 A | 12/2000 | Witczak et al. | |
| 6,305,588 B1 | 10/2001 | Michel et al. | |
| 6,357,936 B1 | 3/2002 | Elberbaum | |
| 6,665,909 B2 | 12/2003 | Collins et al. | |
| 6,844,988 B2 | 1/2005 | Sasaki et al. | |
| 6,957,978 B2 | 10/2005 | Zoller | |
| 7,093,742 B2 | 8/2006 | Steven, III et al. | |
| 7,354,304 B2 | 4/2008 | Livingston | |
| 7,369,656 B2 * | 5/2008 | Goradesky | A45F 5/02 379/446 |
| 7,374,142 B2 | 5/2008 | Carnevali | |
| 7,508,932 B1 | 3/2009 | Bergh | |
| 7,635,112 B2 | 12/2009 | Lin | |
| 7,644,895 B2 * | 1/2010 | Tseng | H05K 5/0204 224/575 |
| 7,661,567 B2 | 2/2010 | Myers | |
| 7,850,484 B2 | 12/2010 | Hayashi et al. | |
| 7,960,658 B2 | 6/2011 | Mock | |
| 8,073,131 B2 * | 12/2011 | Bodkin | A45C 3/001 132/309 |
| 8,112,037 B2 | 2/2012 | Ketari | |
| 8,560,031 B2 | 10/2013 | Barnett et al. | |
| 8,737,066 B1 * | 5/2014 | Block | A45F 5/00 224/217 |
| 8,830,663 B2 | 9/2014 | Child et al. | |
| 8,887,902 B1 | 11/2014 | Liu | |
| 9,243,739 B2 | 1/2016 | Peters | |
| 9,367,090 B2 * | 6/2016 | Barnett | G06F 1/1626 |
| 9,596,393 B2 | 3/2017 | Barros et al. | |
| 9,663,976 B2 | 5/2017 | Evans et al. | |
| 9,699,285 B1 | 7/2017 | Lundsgaard et al. | |
| 9,781,319 B2 | 10/2017 | Barros et al. | |
| 9,787,348 B2 * | 10/2017 | Srour | H04B 1/3888 |
| 9,804,636 B2 * | 10/2017 | Barnett | G06F 1/1632 |
| 9,843,133 B2 | 12/2017 | Kashani et al. | |
| 9,850,926 B2 | 12/2017 | Buchanan | |
| 9,872,544 B2 | 1/2018 | Ho | |
| 9,897,818 B2 | 2/2018 | Haymond | |
| 9,958,107 B1 * | 5/2018 | Hobbs | F16M 13/022 |
| 10,200,518 B2 * | 2/2019 | Richter | A45F 5/00 |
| 2002/0176571 A1 | 11/2002 | Louh | |
| 2003/0102341 A1 | 6/2003 | Iitsuka | |
| 2005/0040192 A1 | 2/2005 | Steven et al. | |
| 2007/0225031 A1 | 9/2007 | Bodkin et al. | |
| 2008/0078792 A1 * | 4/2008 | Tages | A45F 5/02 224/271 |
| 2009/0284391 A1 | 11/2009 | Berkobin et al. | |
| 2011/0024470 A1 | 2/2011 | Hajarian | |
| 2011/0297566 A1 | 12/2011 | Gallagher et al. | |
| 2011/0311335 A1 | 12/2011 | Wike | |
| 2013/0069381 A1 | 3/2013 | Sakamoto | |
| 2013/0146625 A1 * | 6/2013 | Karle | A45F 5/00 224/217 |
| 2014/0221058 A1 * | 8/2014 | Jand | A45C 11/00 455/575.8 |
| 2014/0317329 A1 | 10/2014 | Barnett et al. | |
| 2015/0305465 A1 * | 10/2015 | Barker | A45F 5/02 150/104 |
| 2017/0251794 A1 * | 9/2017 | Kostal | A45F 5/021 |
| 2018/0000234 A1 * | 1/2018 | White | B25H 3/00 |
| 2018/0092534 A1 | 4/2018 | Nabhan | |
| 2018/0288204 A1 * | 10/2018 | Nahum | H04M 1/04 |

FOREIGN PATENT DOCUMENTS

| | | |
|---|---|---|
| KR | 200396216 Y1 | 9/2005 |
| WO | WO-2009/019811 A1 | 2/2009 |
| WO | WO-2012/125690 A1 | 9/2012 |

OTHER PUBLICATIONS

International Search Report and Written Opinion for International Application No. PCT/US2018/041232, dated Aug. 24, 2018.
U.S. Appl. No. 15/579,934, Expandable Sockets for Use with Portable Media Players, filed Aug. 17, 2017.
International Application No. PCT/US2018/056070, International Search Report and Written Opinion, dated Feb. 22, 2019.
International Application No. PCT/US2018/056070, Invitation to Pay Additional Fees, dated Jan. 2, 2019.

* cited by examiner

EXPANDABLE SOCKET ACCESSORY

FIELD OF DISCLOSURE

The present disclosure relates generally to a socket accessory and more particularly to expandable socket accessories that can be attached to portable electronic devices or cases for portable electronic devices and used as grips, stands, or for other purposes.

BACKGROUND

Portable electronic devices, such as MP3 players and smart phones, are often housed in protective covers or cases in order to protect the device from damage, provide a grip for handling the device, and/or provide a stand for propping the device on a surface. Such cases increase the effective size of the device. Expandable sockets, which may be attached directly to the device or to the case protecting the device, are used for a variety of functions, including propping the device on a surface and providing an expandable grip for handling the device. The expandable sockets have decorative buttons, which may display logos, decals, symbols, or other artistic renderings.

SUMMARY

According to one or more examples of the present disclosure, an expandable socket accessory is constructed to permit a user to slidably remove an expandable socket from a platform, which is attached to a portable device or case, and replace the interchangeable expandable socket with a different expandable socket.

In first aspect of the present disclosure provides an expandable socket accessory that may include a body movable between an expanded configuration and a collapsed configuration. The body may include a first end and a second end. A platform may be removably connected to the second end of the body. The platform may include a top surface, a bottom surface, and a collar extending axially away from the top surface. The collar may define a side opening and an inner radial surface. The side opening is sized to slidably receive at least a portion of the second end of the body. The inner radial surface of the platform may cooperate with and retain the second end of the body in connection with the platform.

A second aspect of the present disclosure provides an expandable socket accessory that may include a body movable between an expanded configuration and a collapsed configuration. The body may include a first end and a second end. A platform may be adapted to removably connect to the second end of the body. The platform may include a side opening sized to slidably receive at least a portion of the second end of the body. The body may be slidable relative to the side opening between a locked configuration, in which the body is connected to the platform, and an unlocked configuration, in which the body is disconnected from the platform.

A third aspect of the present disclosure provides an expandable socket adapted to connect to a platform. The socket may include a body including a first end, a second end, and a longitudinal axis. The second end may include a hub, a shoulder, a tip, and a wall extending axially away from the shoulder relative to the longitudinal axis. The hub may include a radially extending tab removably disposed around the wall. The body may be movable on the longitudinal axis between an expanded configuration and a collapsed configuration.

In further accordance with any one or more of the foregoing first, second, and third aspects, the expandable socket accessory and expandable socket may include any one or more of the following forms.

In some forms, the second end of the body may include a hub removably coupled around the body. The hub may include a radially extending tab residing within the side opening of the collar.

In some forms, the platform may include an inwardly extending detent engaging the hub to further assist with retaining the second end of the body and the platform in connection.

In some forms, the second end of the body may include a groove, and the tab of the hub may include an aperture and a protruding member extending into the aperture. The protruding member may be disposed in the groove.

In some forms, the second end of the body may include a resilient annular rib in snap-fit connection with the inner radial surface of the collar.

In some forms, the collar may include an axially extending sidewall and a flange extending radially inward from the sidewall. The flange may define the inner radial surface.

In some forms, the flange of the collar may be resilient and in snap-fit connection with the second end of the body.

In some forms, the collar may be arcuate.

In some forms, the collar may be C-shaped.

In some forms, the platform may include a top surface, a bottom surface, and a collar extending axially away from the top surface. The side opening may be formed in the collar.

In some forms, the platform may include an inner radial surface sized to engage the second end of the body when the body is in the locked configuration.

In some forms, the body may include a hub removably coupled to the second end. The hub may include a radially extending tab residing within the side opening of the platform when the body is in the locked configuration.

In some forms, the tab of the hub may include an aperture and a protruding member extending into the aperture. The protruding member may be disposed within an annular groove formed in the second end of the body.

In some forms, the platform may include an inwardly extending detent engaging the tab of the hub to further assist with retaining the second end of the body and the platform in connection.

In some forms, the body may include a groove disposed between the wall and the tip, and the tab of the hub may include a protruding member in snap-fit connection with the groove of the body.

In some forms, the groove of the body may be an annular groove, and the protruding member may be an annular ring within the annular groove of the body.

In some forms, the hub may include a grip adjacent to a portion of the wall of the second end of the body.

In some forms, the socket may include a button removably attached to the first end of the body.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several Figures, in which:

DETAILED DESCRIPTION

Figure 1:
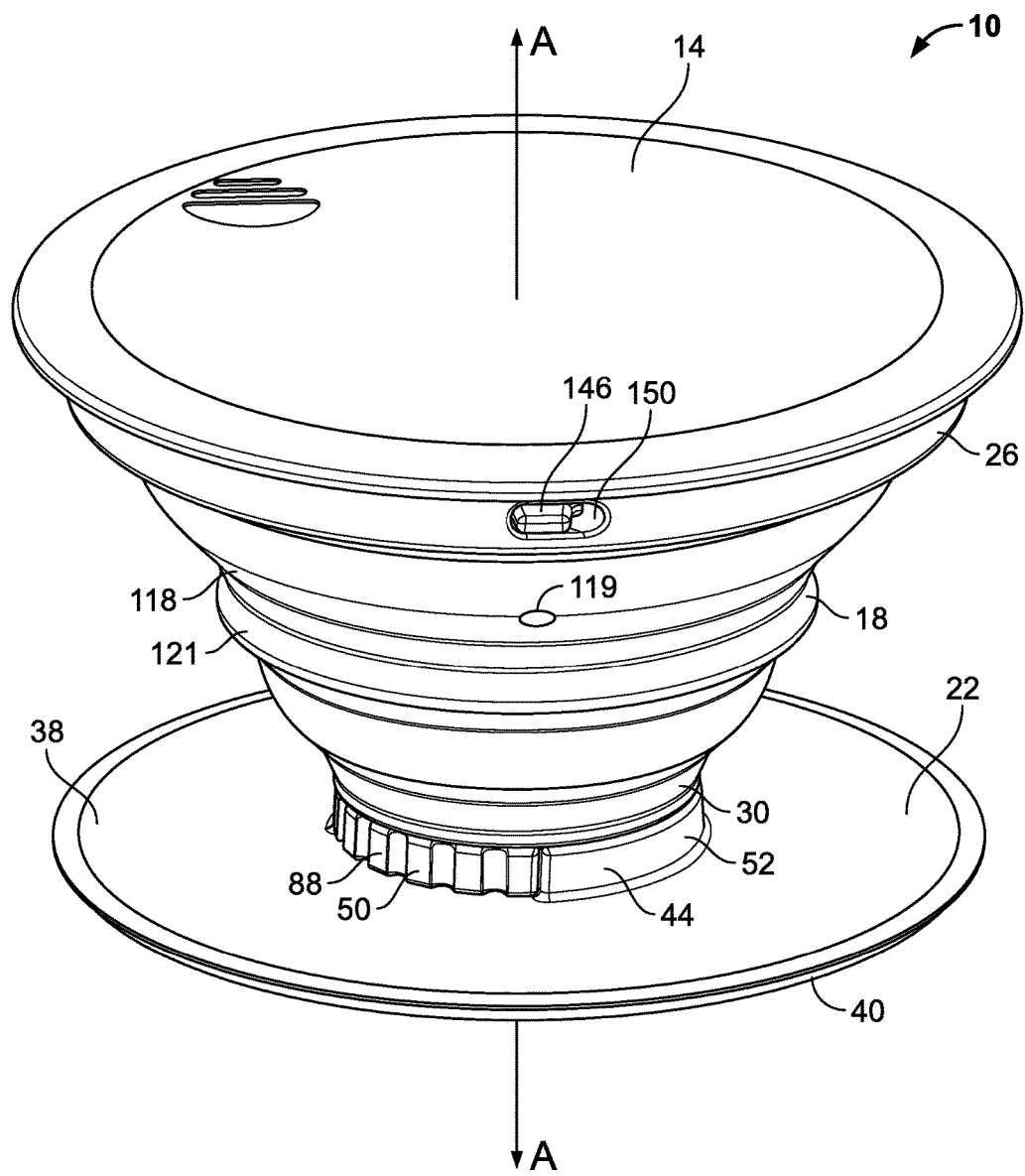
FIG. 1 is an isometric view of a first exemplary expandable socket accessory constructed in accordance with the teachings of the present disclosure.

A quick-release expandable socket accessory 10 for a portable device, such as a portable media player, constructed in accordance with the present disclosure provides a platform 22 that attaches directly to a portable device or to a protective case of the portable device. The platform 22 permits an expandable socket 12 to be easily coupled to and removed from the platform 22 and, if desired, replaced with a different expandable socket 12. A body 18 of the socket 12 includes a hub 50 removably coupled to the body 18, which facilitates securing the body 18 to the platform 22. Each of the platform 22 and the body 18 may be designed in a variety of shapes and sizes to facilitate slidably locking and slidably releasing the body 18 to the platform 22.

Figure 2:
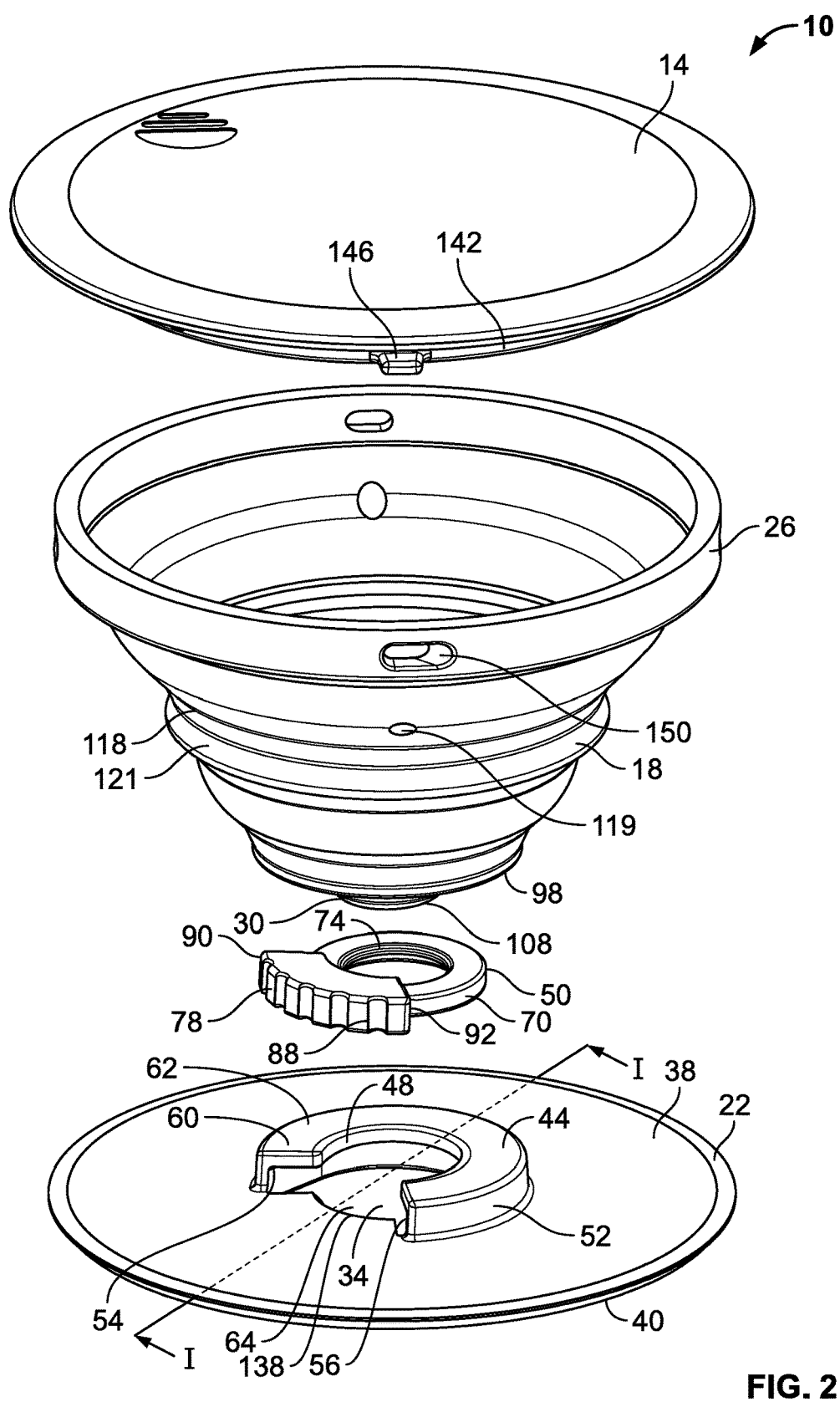
FIG. 2 is an exploded view of the expandable socket accessory of FIG. 1, including a first exemplary button, a first exemplary body including a first exemplary hub, and a first exemplary platform.
Figure 3:
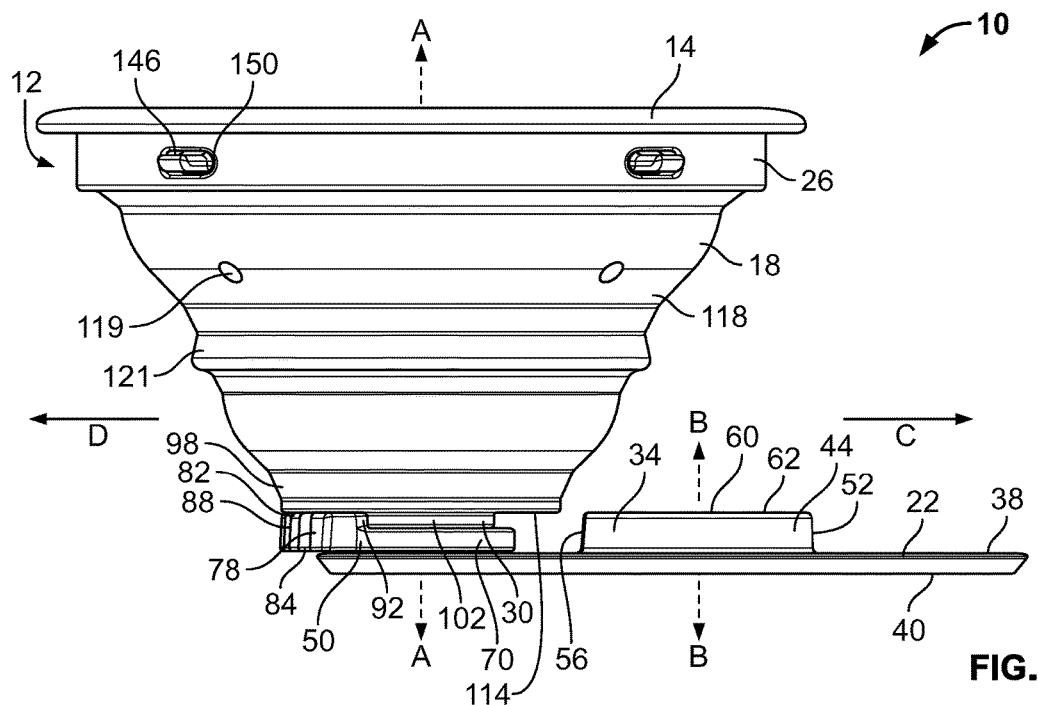
FIG. 3 is a side view of an expandable socket disconnected from the platform of the socket accessory of FIG. 1, the expandable socket is in an unlocked (or uncoupled) configuration.

Turning to FIGS. 1 and 2, a first exemplary expandable socket accessory 10 is constructed in accordance with the teachings of the present disclosure. The expandable socket accessory 10 includes a removable button 14, a body 18 removably attached to the button 14, and a platform 22 that is removably connected to the body 18 and attachable to a portable device (not shown) or a case for a portable device. The body 18 of the socket accessory 10 is movable between an unlocked configuration, as shown in FIG. 3, in which the body 18 is disconnected from the platform 22, and a locked configuration, as shown in FIG. 1, in which the body 18 is connected to the platform 22. The body 18 includes a longitudinal axis A, a first end 26 that is attached to the button 14, and a second end 30 that is removably connected to the platform 22. In particular, the body 18 connects to the platform 22 by sliding the second end 30 within a side opening 34 of the platform 22 until the body 18 locks or snaps into the platform 22.

The platform 22 is adapted to be removably connected to the second end 30 of the body 18, and includes a top surface 38, a bottom surface 40, and a collar 44 extending axially away (upward in FIG. 1) from the top surface 38. The collar 44, which is best illustrated in FIG. 2, defines the side opening 34 that is sized to slidably receive at least a portion of the second end 30 of the body 18. The collar 44 also defines an inner radial surface 48 that cooperates with and retains the second end 30 of the body 18 in connection with the platform 22 when the body 18 is coupled to the platform 22. In particular, the collar 44 includes an arcuate sidewall 52 that extends axially away (upward in FIG. 1) from the top surface 38 and extends around a longitudinal axis B of the platform 22 from a first end 54 to a second end 56. A flange 60 provides a top surface 62 to the collar 44, and is substantially perpendicular to the sidewall 52. The flange 60 extends radially inward from the sidewall 52 to define the inner radial surface 48 of the collar 44. The sidewall 52 and the flange 60 extend around the longitudinal axis B from the first end 54 to the second end 56, defining an arcuate collar 44. The collar 44 partially encloses a cavity 64 that is sized to receive a portion of the body 18. The flange 60 of the collar 44 may be resilient (e.g. deformable, flexible, pliable) to permit the second end 30 of the body 18 to connect with, and disconnect from, the platform 22. While the collar 44 is generally arcuate, the collar 44 may specifically have a C-shape to best receive a round (e.g. circular) second end 30 of the body 18. However, in other examples, the collar 44 may have a different shape that corresponds with an outer shape of the second end 30 of the body 18.

Also shown in FIG. 2, the body 18 includes a hub 50 removably coupled to the second end 30 of the body 18. The hub 50 includes a radially extending tab 70, which defines an aperture 74, and a grip 78 attached to the tab 70. The radially extending tab 70 includes a protruding member 80 (FIG. 4) extending into the aperture 74 of the tab 70. The protruding member 80 is sized to couple to the second end 30 of the body 18, and may be an annular ring or a plurality of protruding tabs. The grip 78 includes a flat top surface 82, a bottom surface 84, and a corrugated edge 88. The grip 78 is shaped to fit around the second end 30 of the body 18 and abut against the collar 44 of the platform 22 when the accessory 10 is fully assembled. For example, the grip 78 includes a first angled end 90 and a second angled end 92 shaped to abut the first and second ends 54 and 56 of the collar 44. The grip 78 also includes an interior edge 94 disposed opposite the corrugated edge 88. The interior edge 94 extends between the first and second angled ends 90 and 92 of the grip 78, and is curved to abut a round portion of the second end 30 of the body 18. The ends 90 and 92 of the grip 78 are angled such that corrugated edge 88 is wider than the interior edge 94 of the grip 78. While the hub 50 is shaped to fit against the first and second ends 54 and 56 of the collar 44, other examples of the hub 50 may be formed according to a different configuration and/or shape of the platform 22 and body 18.

Figure 4:
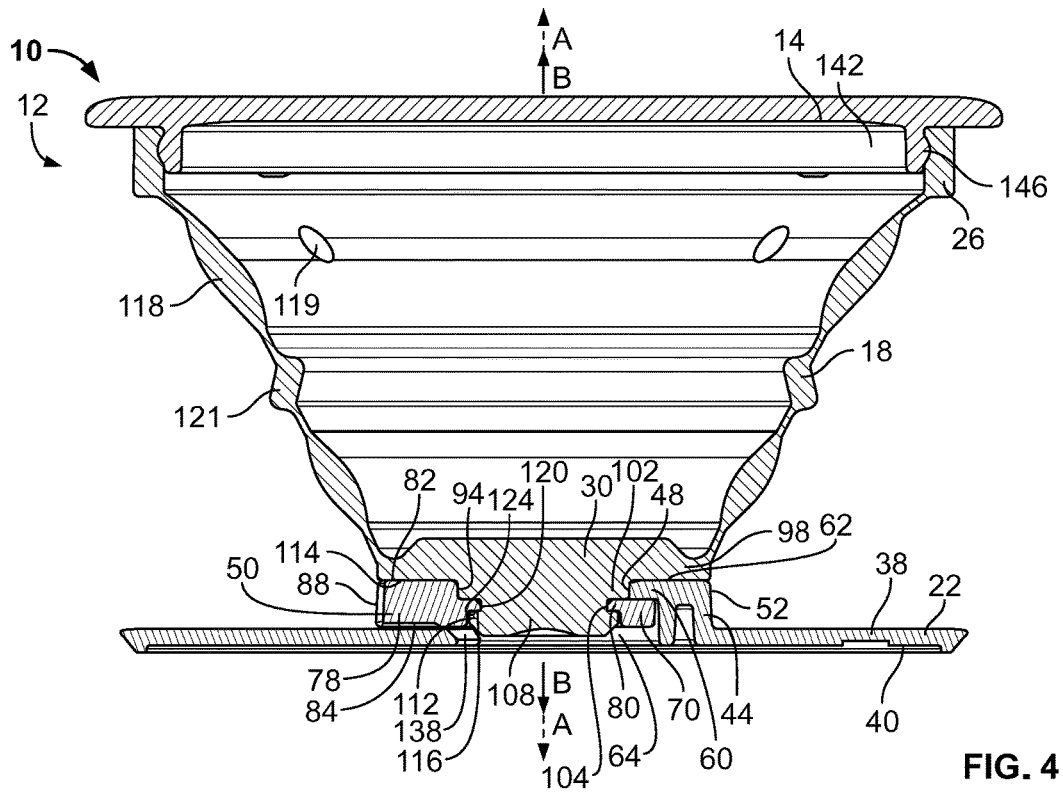
FIG. 4 is a side, cross-sectional view of the expandable socket accessory of FIG. 1.

As mentioned above, the body 18 of the expandable socket accessory 10 is movable between an unlocked configuration, shown in FIG. 3, in which the body 18 is disconnected from the platform 22, and a locked configuration, as shown in FIG. 4, in which the body 18 is connected to the platform 22. As used herein, an "expandable socket" 12 may refer to the assembled body 18 shown in FIG. 3, which includes the attached button 14 and the hub 50 around the second end 30 of the body 18. However, the expandable socket 12 may also refer to the body 18 and attached button 14 or the body 18 and coupled hub 50. In the unlocked configuration illustrated in FIG. 3, the expandable socket 12 is disconnected from the platform 22 and the second end 30 of the body 18 is adjacent to the side opening 34. The second end 30 of the body 18 is coupled to the hub 50 such that the tab 70 of the hub 50 is disposed around the second end 30 of the body 18. The body 18 is vertically disposed relative to the platform 22 where the longitudinal axis A of the body 18 is parallel with the longitudinal axis B of the platform 22. The second end 30 of the body 18 is positioned so that the expandable socket 12 is aligned with the side opening 34 formed in the collar 44. In this position, the expandable socket 12 can move perpendicular to the longitudinal axis A in a direction C and the second end 30 can slide into the side opening 34 of the platform 22. The body 18 couples to the platform 22 when the inner radial surface 48 of the collar 44 engages the second end 30 of the body 18. To unlock the expandable socket 12 from the platform 22, the grip 78 of the hub 50 may be pulled in a direction D (i.e., the opposite direction of direction C) to disengage the body 18 from the inner radial surface 48 of the collar 44.

Figure 5:
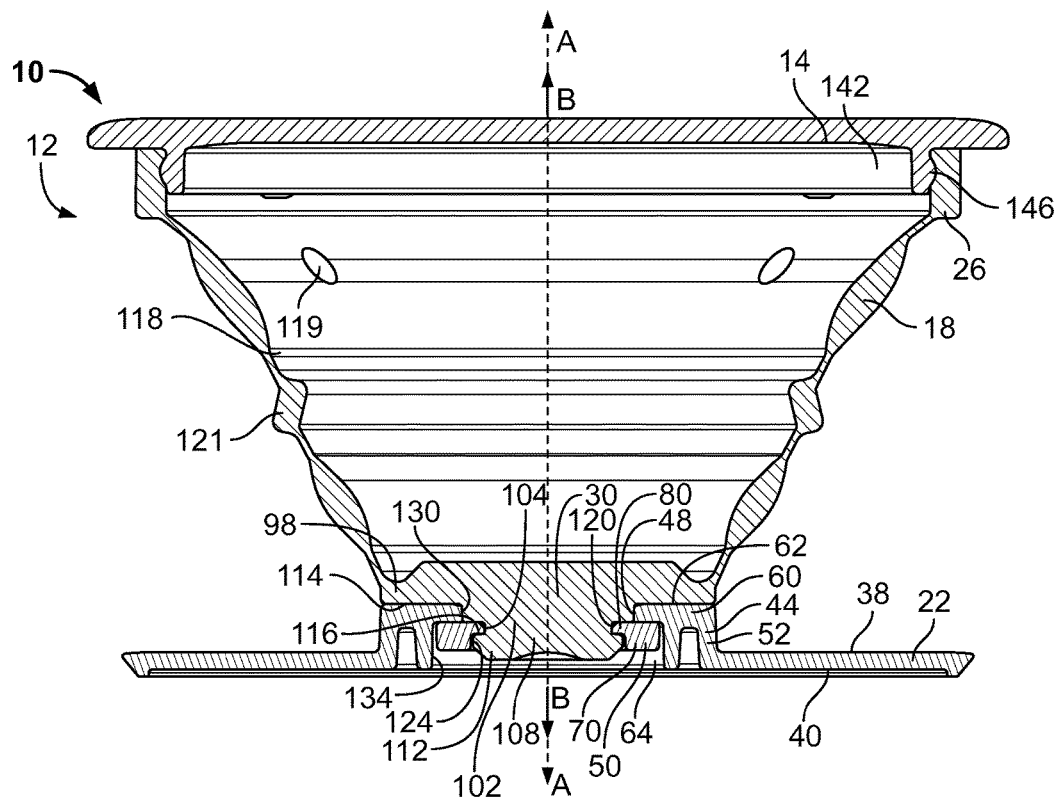
FIG. 5 is a front, cross-sectional view of the expandable socket accessory of FIG. 1.

FIGS. 4 and 5 best illustrate the second end 30 of the body 18 in connection with the platform 22 when the body 18 is in the locked configuration. As shown in FIG. 4, the inner radial surface 48 of the collar 44 is engaged with the second end 30 of the body 18, and the hub 50 is coupled around the second end 30 of the body 18. The tab 70 of the hub 50 resides within the side opening 34 of the collar 44 of the platform 22, and the grip 78 is disposed adjacent to the collar 44 and outside the cavity 64.

The second end 30 of the body 18 includes a shoulder 98, a vertical wall 102, an annular groove 104, and a tip 108 with a tapered edge 112. The annular groove 104 is disposed between the tip 108 and the vertical wall 102, and is sized to receive the protruding member 80 of the hub 50. The vertical wall 102 may be a smooth, circular band that separates the tip 108 from the shoulder 98 and that is configured to mate with the inner radial surface 48 of the platform 22. The vertical wall 102 extends axially away (e.g. downward in FIGS. 2-6) from the shoulder 98 relative to the longitudinal axis A. In one example, the vertical wall 102 may be an annular rib that is sized to snap-fit with the inner radial surface 48 of the platform 22. The shoulder 98 extends radially past the vertical wall 102 and includes a flat surface 114 parallel to the top surface 62 of the collar 44. The flat surface 114 of the shoulder 98, the top surface 62 of the collar 44, and the top surface 82 of the grip 78 are in a cooperative arrangement to help the body 18 slide relative to the platform 22 between the locked and unlocked configurations. In the locked configuration, the flat surface 114 of the shoulder 98 partially rests against the top surface 82 of the grip 78, as shown in FIG. 4, and partially rests on the top surface 62 of the flange 60 of the collar 44, as shown in both FIGS. 4 and 5. The tapered edge 112 has a width greater than the diameter of the protruding member 80. When the hub 50 is coupled around the body 18, the tapered edge 112 of the tip 108 engages with an underside 116 of the protruding member 80.

The vertical wall 102 of the second end 30 may be resilient (e.g. deformable, flexible, pliable) to permit the second end 30 to connect with, and disconnect from, the platform 22. For example, the body 18 may be a pliable material that permits the vertical wall 102 of the second end 30 to slightly deform (e.g. flex, bend) to connect with the inner radial surface 48 of the platform 22. When the body 18 is disconnected from the platform 22, the second end 30 of the body 18 may return to its initial shape without sustaining substantial permanent deformation. Additionally, the tip 108 may be resilient to permit the tapered edge 112 of the tip 108 to deform by flexing inwardly relative to the longitudinal axis A of the body 18 when the second end 30 is pushed through the aperture 74 of the hub 50 and engages the protruding member 80. Once the tapered edge 112 is pushed through (downward in FIGS. 4 and 5) and past the protruding member 80 of the hub 50, the annular groove 104 may receive the protruding member 80 of the tab 70 and the tapered edge 112 may return to its initial shape. In this position, the tapered edge 112 extends beyond the diameter of the protruding member 80. After the body 18 is coupled to the platform 22, the shoulder 98 of the body 18 keeps the body 18 from moving vertically (e.g., downward in FIGS. 4 and 5) from the platform 22, and the tapered edge 112 of the tip 108 keeps the body 18 from moving vertically (e.g., upward in FIGS. 4 and 5) from the platform 22 by catching the underside 116 of the protruding member 80 of the hub 50. In another example, the protruding member 80 of the hub 50 may be a resilient annular ring that is configured to be in snap-fit connection with the annular groove 104 of the second end 30. The body 18 is preferably made of a flexible material, such as polyester-based thermoplastic polyurethane elastomer, that may be formed by injection molding, thermoforming, or compression molding, or may be any equivalently functional material suitable for its intended purpose.

In the illustrated example, the second end 30 of the body 18 connects to the hub 50 when the tip 108 of the body 18 passes through the aperture 74 of the tab 70 and the protruding member 80 of the hub 50 snaps into the annular groove 104 of the body 18. In other examples, the hub 50 may couple to the body 18 by a different locking mechanism. In one example, the hub 50 may include a groove that is sized to receive a protruding member disposed at the second end 30 of the body 18. The locking mechanism which connects the hub 50 to the second end 30 of the body 18 may be circular, as illustrated, or the locking mechanism may have a different shape. For example, the second end 30 of the body 18 may include external threads, and the tab 70 of the hub 50 may include internal threads configured to receive and couple with the external threads of the body 18. In yet another example, the locking mechanism may be a luer-lock in which the hub 50 includes a female member and the second end 30 of the body 18 includes a male member that rotatably couples to the female member of the hub 50.

Figure 6:
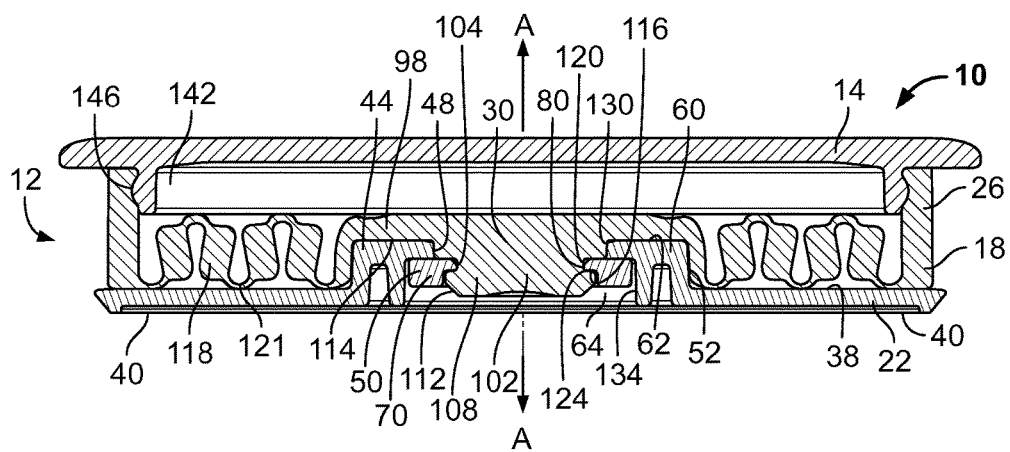
FIG. 6 is a front, cross-sectional view of the expandable socket accessory of FIG. 1 in a collapsed configuration.

As shown in FIGS. 5 and 6, the body 18 is movable between an expanded configuration, and a collapsed configuration. In FIG. 5, the body 18 is extended to occupy its largest volume, and in FIG. 6, the body 18 is folded so that the socket accessory 10 has a reduced volume. The body 18 takes the form of an accordion-like structure made of a deformable and durable material. The accordion-like structure includes a folding portion 118 that includes a plurality of relatively rigid walls interspersed with flexural (or "living") hinges 121. The folding portion 118 is disposed between the first end 26 and the second end 30 of the body 18, and is symmetrical about the longitudinal axis A of the body 18. A plurality of vents 119 are formed through the folding portion 118 of the body 18 to facilitate collapsing and expanding of the body 18 between the collapsed configuration and the expanded configuration, and a plurality of intermediary configurations between the collapsed and expanded configurations.

Generally, the expandable socket 12 may be moved from the locked configuration to the unlocked configuration by overcoming the frictional forces between engaging surfaces of the body 18 and the platform 22. Generally speaking, a user of the expandable socket accessory 10 may slide the body 18 from the locked configuration to the unlocked configuration by grabbing or grasping the corrugated edge 88 of the hub 50, the button 14, or another part of the body 18, and moving (e.g., sliding) the body 18 in the D direction, which causes the radial inner surface 48 of the platform 22 to release (e.g. disengage, disconnect) from the second end 30 of the body 18.

Figure 7:
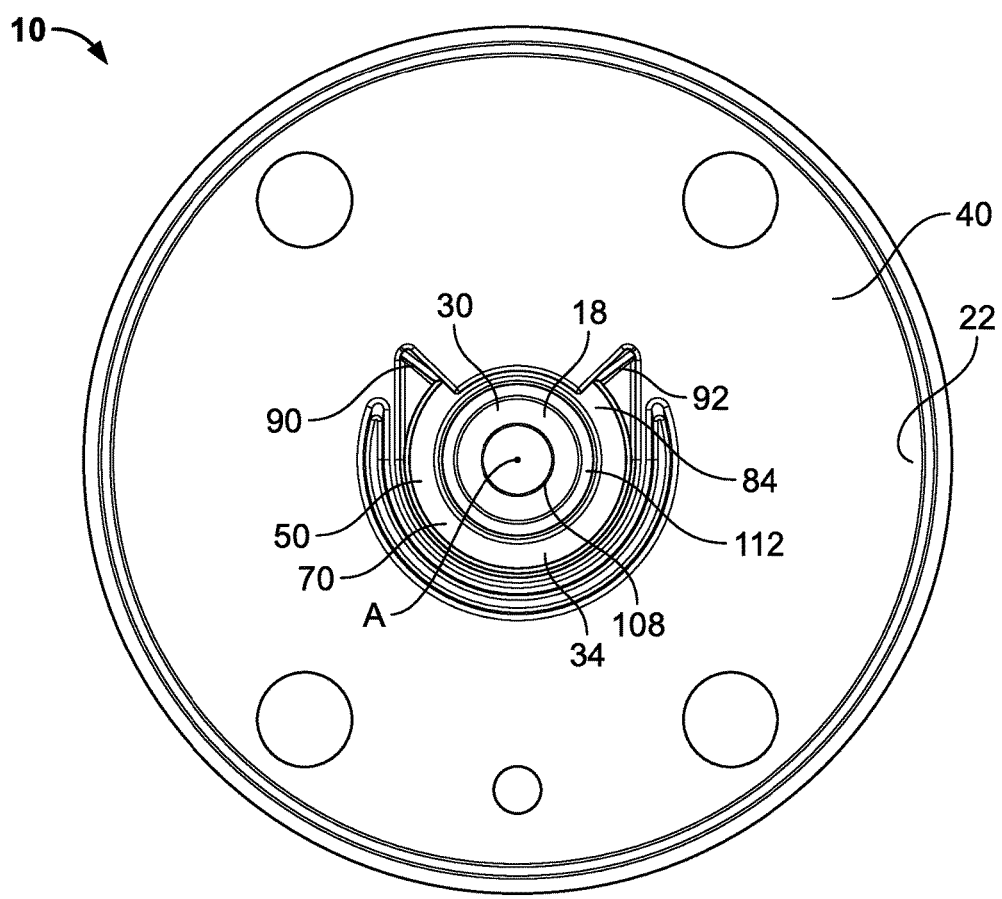
FIG. 7 is a bottom view of the expandable socket accessory of FIG. 1.

The socket accessory 10 may be assembled by first connecting the hub 50 to the second end 30 of the body 18, and then connecting the body 18 to the platform 22. Generally, the body 18 may be slid horizontally relative to the longitudinal axis B of the platform 22 until the longitudinal axis B of the platform 22 and the longitudinal axis A of the body 18 are aligned. FIG. 7 illustrates the second end 30, the hub 50, and the platform 22 aligned with the longitudinal axis A of the body 18. In another example, the body 18 may not include the hub 50, and the body 18 may be gripped at the first end 26 or the second end 30 to move the body 18 between the locked and unlocked configurations.

Figure 8:
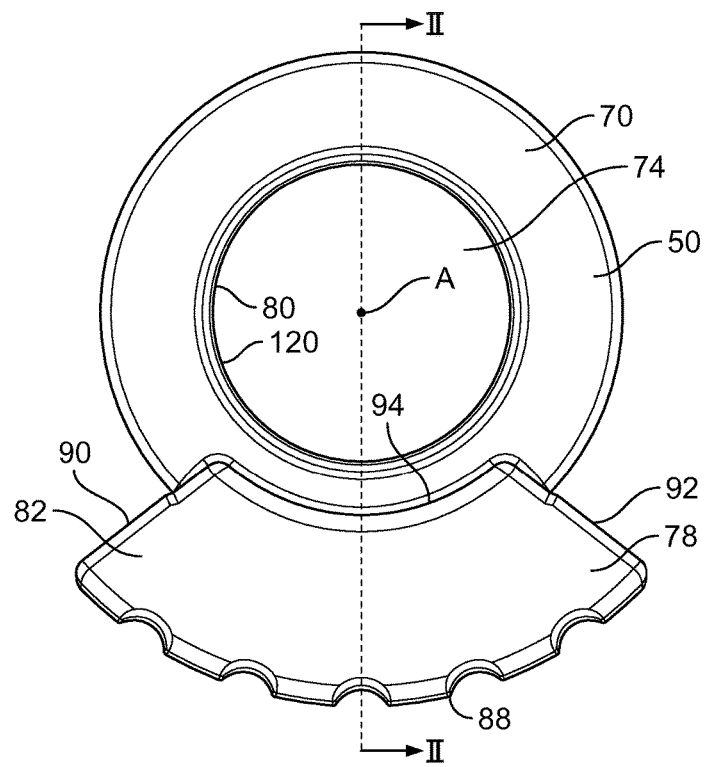
FIG. 8 is a top view of the hub of FIG. 1.
Figure 9:
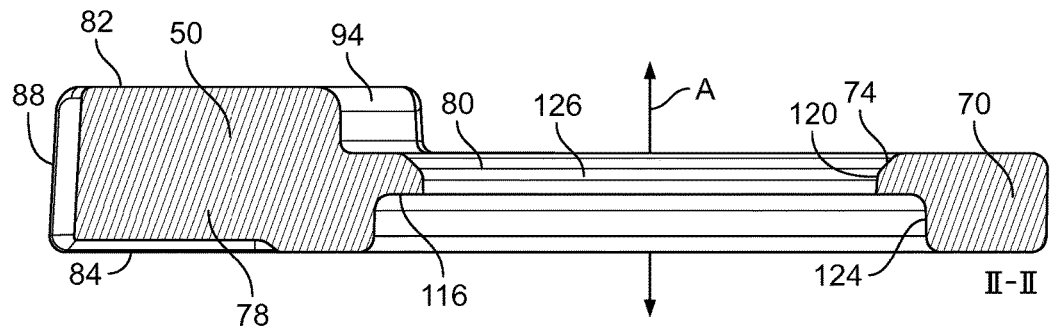
FIG. 9 is a cross-sectional view of the hub taken at II-II of FIG. 8.

Turning to FIGS. 8 and 9, the tab 70 of the hub 50 generally forms a circular ring about the longitudinal axis A. The grip 78 of the hub 50 extends from the tab 70 in both the radial direction (e.g., downward in FIG. 8) and the axial direction (e.g., upward in FIG. 9) relative to the longitudinal axis A. In the illustrated example, the circular aperture 74 and the annular ring 80 of the tab 70 are defined by a first bore 120 and a second bore 124. The first bore 120 defines an interior side 126 of the protruding member 80, and the second bore 124 of the hub 50 is sized so that the tab 70 may receive the tapered edge 112 of the tip 108 when the hub 50 is coupled around the body 18. The first and second bores 120 and 124 define the protruding member 80 and the underside 116 of the protruding member 80. The first and second bores 120 and 124 are concentrically aligned relative to the longitudinal axis A. In other examples, the tab 70 of the hub 50 may have a non-circular aperture 74, and the first and second bores 120 and 124 may have corresponding non-circular geometries adapted to receive the non-circular geometry of the body 18. For example, the hub 50 may include a rectangular aperture 74 with one or more protruding members 80 extending into the aperture 74, and the second end 30 of the body 18 may include a four-sided, rectangular wall 102 and a non-circular tip 108 shaped to couple with the hub 50.

Figure 10:
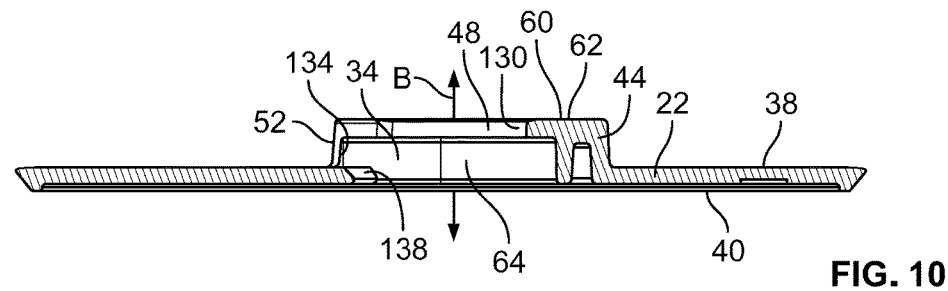
FIG. 10 is a cross-sectional view of the platform taken at I-I of FIG. 1.

As shown in FIG. 10, the platform 22 includes a first bore 130 defining the inner radial surface 48 and a second bore 134 sized to slidably receive the tab 70 of the hub 50. The first and second bores 130 and 134 define the partially enclosed cavity 64 of the platform 22. The cavity 64 is sized to house the tab 70 of the hub 50 and a portion of the second end 30 of the body 18 when the accessory 10 is assembled. At the side opening 34 of the platform 22, a flap 138 may be formed the top surface 38 of the platform 22. The flap 138 has an interior edge that is angled to match the tapered edge 112 of the body 18. Turning back to FIG. 4, the flap 138 formed is proximal to the opening 34 and the angled edge is adjacent to the tapered edge 112 of the tip 108 of the body 18. The tapered edge 112 of the tip 108 may slide against the angled edge of the flap 138 of the platform 22 before the body 18 is completely removed from the platform 22. The angled edge of the flap 138 helps guide the second end 30 of the body 18 away from the opening 34 in the D direction to facilitate removal of the expandable socket 12 from the platform 22. Further, the platform 22 may include a dividing wall.

To change the overall appearance of the socket accessory 10, the button 14 is removably coupled to the first end 26 of the body 18. In this example, the first end 26 of the body 18 is coupled to a vertically extending wall 142 of the button 14 by inserting a plurality of tabs 146 extending outwardly from the wall 142 of the button 14 into a plurality of oval apertures 150 formed in the first end 26 of the body 18. The plurality of tabs 146 are aligned with the plurality of apertures 150, and the tabs 146 may be sized to extend through the apertures 150 of the first end 26 of the body 18. In the illustrated example, the button 14 is coupled to the first end 26 the body 18 and the bottom surface 40 of the platform 22 may include an adhesive to facilitate attachment of the platform 22 to the portable device or the case for the portable device. However, in another example socket accessory 10, the button 14 may be attached to or integrated with the bottom surface 40 of the platform 22 and the adhesive may be disposed opposite from the button 14 at the first end 26 of the body 18.

The platform 22 is preferably made of a durable plastic, such as polyethylene, or a harder plastic, such as polycarbonate, that may be formed by injection molding, thermoforming, or compression molding, but may instead be formed of any other suitable and durable material including metal, fiberglass, or any combination of these materials, or any equivalently functional materials suitable for its intended purpose.

Figure 11:
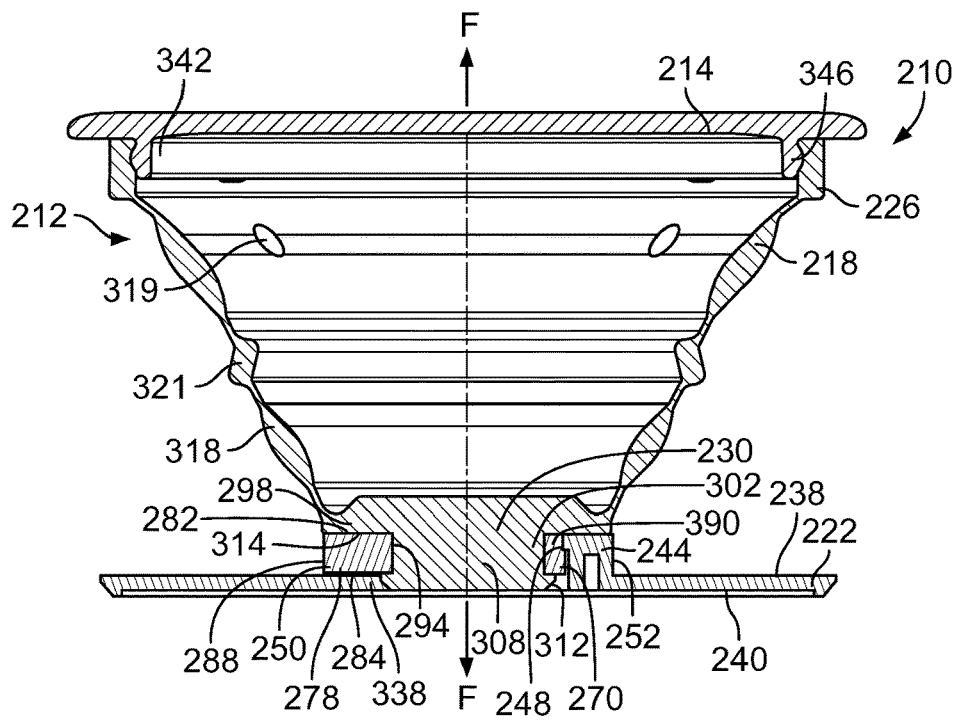
FIG. 11 is a front, cross-sectional view of a second exemplary expandable socket accessory constructed in accordance with the teachings of the present disclosure.
Figure 12:
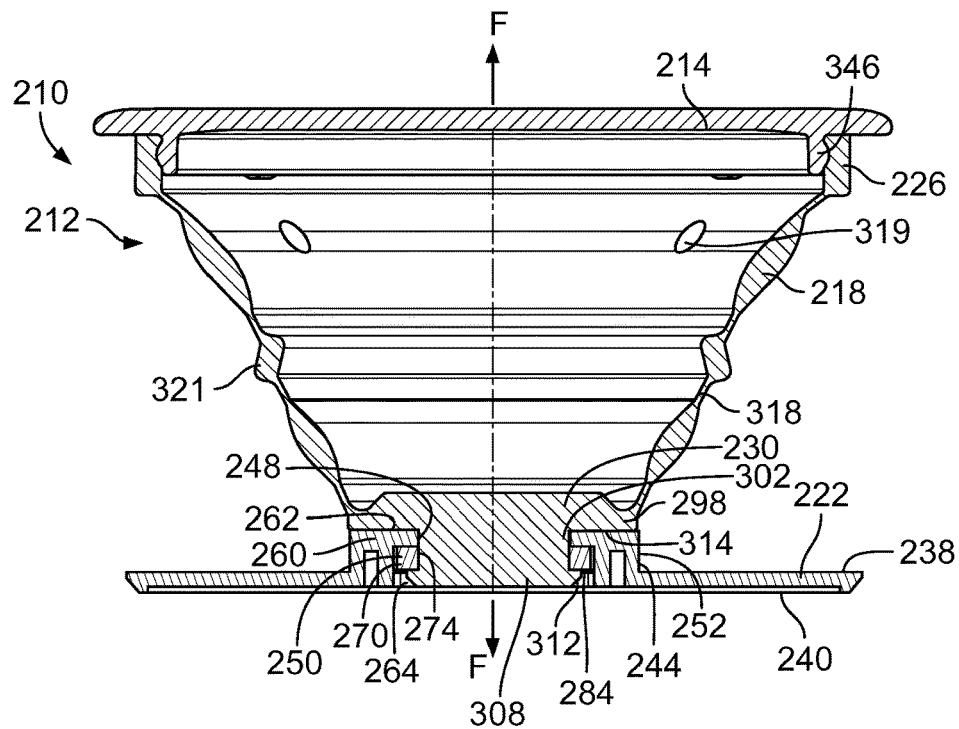
FIG. 12 is a side, cross-sectional view of the expandable socket accessory of FIG. 11.
Figure 13:
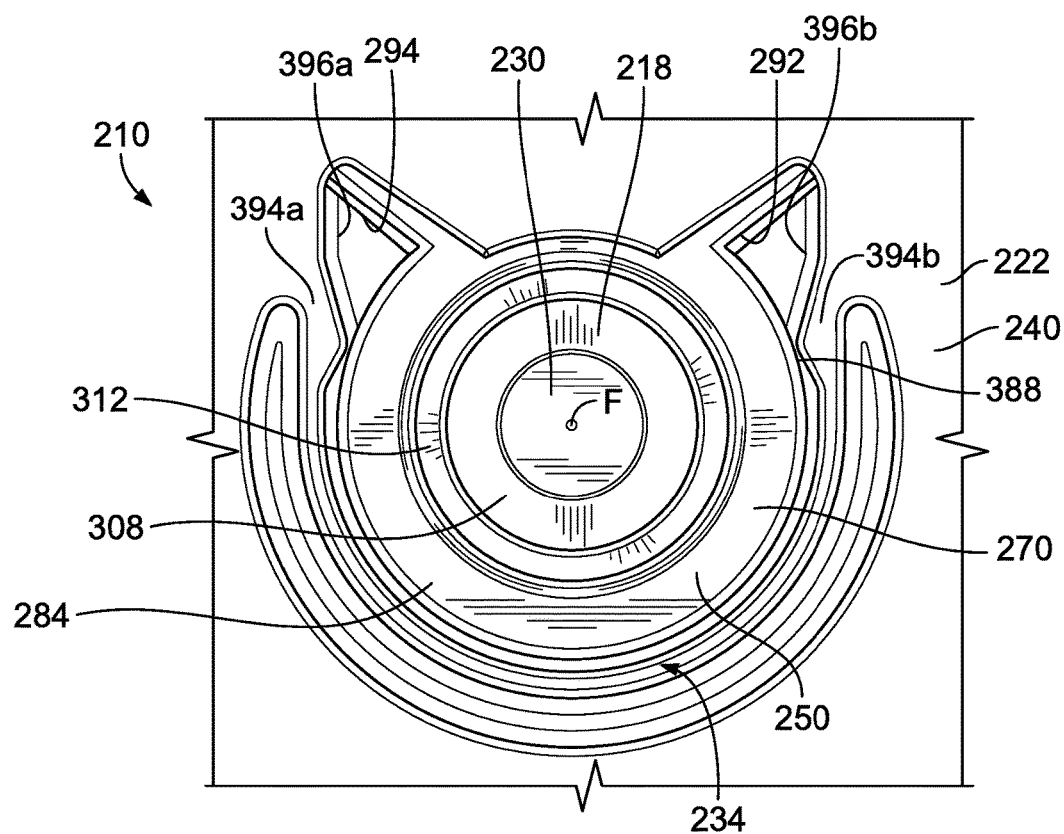
FIG. 13 is a partial, bottom view of the expandable socket accessory of FIG. 11.

In FIGS. 11-13, a second exemplary socket accessory 210 is constructed in accordance with the teachings of the present disclosure. The second exemplary socket accessory 210 includes a body 218, a button 214, and a platform 222 removably coupled to the body 218. The second exemplary body 218 is similar to the body 18 of the first socket accessory 10, and the second exemplary platform 222 is similar to the platform 22 of the first socket accessory 10. Thus, for ease of reference, and to the extent possible, the same or similar components of the body 218 will retain the same reference numbers as outlined above with respect to the first exemplary body 18, although the reference numbers will be increased by 200. Likewise, the same or similar components of the platform 222 will retain the same reference numbers as outlined above with respect to the first exemplary platform 22, although the reference numbers will be increased by 200. However, the second exemplary body 218 and platform 222 differ from the first exemplary body 18 and platform 22, respectively, in the manner discussed below.

As best illustrated in FIGS. 11 and 12, an inner radial surface 248 of the platform 222 engages both a second end 230 of the body 218 and a portion 390 of a hub 250. The hub 250 includes a radially extending tab 270 that is coupled around the body 218 and disposed within a side opening 234 of the platform 222. The second end 230 of the body 218 includes a vertical wall 302, a tip 308, and a shoulder 298, but unlike the first exemplary body 18, the second end 230 of the body 218 does not include an annular groove that receives a protruding member of the hub 250. Rather, the hub 250 connects to the vertical wall 302 of the second end 230 of the body 218 by a snap-fit connection. As shown in FIGS. 11 and 12, the second end 230 of the body 218 is disposed within an aperture 274 of the tab 270, and a tapered edge 312 of the tip 308 engages a bottom surface 284 of the tab 270 to secure the body 218 to the platform 222.

As shown in FIG. 11, the inner radial surface 248 of the platform 222 engages the tab 270 of the body 218. Specifically, a portion 390 of the tab 270 engages the inner radial surface 248 of the platform 222. Similar to the first exemplary platform 22, the second exemplary platform 222 includes a collar 244 that is adapted to slidably receive the body 218. When the body 218 is in the locked configuration, the inner radial surface 248 of the collar 244 connects to the second end 230 of the body 18, as shown in FIG. 12.

In FIG. 13, the second exemplary platform 222 includes a retaining mechanism that further assists with retaining the second end 230 of the body 218 and the platform 222 in connection. The retaining mechanism is formed in the collar 244 of the platform 222 and protrudes inwardly relative to a longitudinal axis F of the body 218 and engages an outer surface 388 of the tab 274. In the illustrated example, the retaining mechanism includes first and second inwardly extending detents 394a and 394b that engage the outer surface 388 of the tab 270 of the hub 250 when the tab 270 is disposed within a cavity 264 of the platform 222. The tab 270 is configured to slide through the opening 234 of the collar 244 and past the detents 394a and 394b as the body 218 moves from the unlocked configuration to the locked configuration. As the tab 270 engages the detents 394a and 394b, the platform 222 partially deforms so that the detents 394a and 394b may flex away from the tab 270 until the tab 270 is fully inserted into the platform 222. The detents 394a and 394b return to their initial configuration, as shown in FIG. 13, and engage with the outer surface 388 of the tab 270 to secure the body 218 to the platform 222.

The detents 394a and 394b of the collar 244 may be resilient (e.g. deformable, flexible, pliable) to permit the tab 270 to connect with, and disconnect from, the platform 222 without requiring much force. Additionally, first and second cut-outs 396a and 396b formed in the platform 222 may facilitate the flexing of each of the detents 394a and 394b. To disconnect the body 218 from the platform 222, the detents 394a and 394b flex outwardly to permit the tab 270 to slide out through the opening 234 of the platform 222. When the body 218 is disconnected from the platform 222, the platform 222 may return to its initial shape without sustaining substantial permanent deformation. The illustrated platform 222 includes two detents 394a and 394b, however, other examples may provide one detent, and therefore one cut-out, or more than two detents and more than two cut-outs.

The socket accessories 10 and 210 are constructed so that the expandable socket 12 and 212 of each accessory 10 and 210 may be swapped for a different body 18 or 218 or a different expandable socket 12 and 212. For example, when an expandable socket 12 of the first exemplary expandable socket accessory 10 is removed from the platform 22, the first expandable socket 12 can be replaced by a second expandable socket 12 by coupling the second body 18 to the platform 22 attached to the portable device or the case of the portable device. It may be desirable to replace the first expandable socket 12 with the second expandable socket 12, a third expandable socket 12, or other expandable sockets to change the overall appearance (e.g., color, design, pattern, visibility, shape, and/or artistic rendering), and size of the expandable socket accessory 10. For example, the first expandable socket 12 may include a first body 18 sized to fit within a hand of a toddler, and may include a button 14 with an artistic rendering likeable to a young demographic. That first expandable socket 12 may be removed and replaced with a second expandable socket 12 including a body 18 and/or a button 14 that is larger and sized to fit within a hand of an average adult, and may include a different button 14 with a different artistic rendering. In a different example, the dimensions (e.g., volume, width, length, wall thickness) of the body 18 may vary to provide a socket with a particular or desirable characteristic. For example, the body 18 may be selected and employed because the length of the folding portion 118 of the body 18 is extra-long to increase the extension of the expandable socket 12 when the expandable socket 12 is in the extended or expanded configuration. In another example, a body 18 having a sturdier structure (e.g. a wider button 14, a wider second end 30, increased thickness of folding portion 118) may be selected and employed to better support a larger or heavier portable device. Thus, the platform 22 can be coupled to any number of expandable sockets 12.

The button 14 attached to the first end 26 of the body 18 may provide a grip that allows a person to slide the folded portion 118 of the body 18 between two fingers such that the platform 22 is disposed within the palm of the person's hand, and the button 14 is disposed adjacent the back of the person's hand. The configuration of the button 14 and the body 18 may also provide a space in which a cord, such as a cord for earphones, may be wrapped and stored around a portion of the body 18. The removable button 14 may also be replaced without completely removing the expandable socket 12 from the platform 22. It may be desirable to remove the button 14 and replace it with another button 14 that features a different aesthetic design, provides a different grip so as to change the look and/or function of the button 14.

The various examples of a quick-release expandable socket accessory constructed in accordance with the teachings of the present disclosure, such as the socket accessories 10 and 210 illustrated and described herein, provide a user with the ability to use a single expandable socket 12 and 212 for multiple devices, or provide a user with the variability and opportunity to easily replace one socket 12 and 212 with a different expandable socket 12 and 212. For example, when multiple users share a single portable device, each user may have their own expandable socket 12 and 212 to couple to the platform 22 and 222 already attached to the shared portable device. This may be especially convenient for a parent to share their device with their toddler. Before handing over the device, the parent may swap out their expandable socket 12 and 212 for an expandable socket 12 and 212 that is specifically designed for a child. As an example, the child's socket 12 and 212 may provide additional grips and protective features that the parent may not use or want. Thus, the quick-release expandable socket accessories 10 and 210 provide functional convenience and aesthetic variability for a user.

The figures and description provided herein depict and describe preferred examples of a quick-release expandable socket accessory for purposes of illustration only. One skilled in the art will readily recognize from the foregoing discussion that alternative examples of the components illustrated herein may be employed without departing from the principles described herein. Thus, upon reading this disclosure, those of skill in the art will appreciate still additional alternative structural and functional designs for expandable sockets with a quick-release feature. Thus, while particular examples and applications have been illustrated and described, it is to be understood that the disclosed examples are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. An expandable socket accessory comprising:
a body movable between an expanded configuration and a collapsed configuration, the body including a first end and a second end; and
a platform removably connected to the second end of the body, the platform including a top surface, a bottom surface, and a collar extending axially away from the top surface, the collar defining a side opening and an inner radial surface, the side opening sized to slidably receive at least a portion of the second end of the body;
wherein the inner radial surface of the platform cooperates with and retains the second end of the body in connection with the platform;
wherein the second end of the body includes a hub removably coupled around the body, the hub comprising a radially extending tab residing within the side opening of the collar.

2. The socket accessory of claim 1, wherein the platform further comprises an inwardly extending detent engaging the hub to further assist with retaining the second end of the body and the platform in connection.

3. The socket accessory of claim 1, wherein the second end of the body includes a groove, and the tab of the hub includes an aperture and a protruding member extending into the aperture, wherein the protruding member is disposed in the groove.

4. The socket accessory of claim 1, wherein the second end of the body includes a resilient annular rib in snap-fit connection with the inner radial surface of the collar.

5. The socket accessory of claim 1, wherein the collar comprises an axially extending sidewall and a flange extending radially inward from the sidewall, the flange defining the inner radial surface.

6. The socket accessory of claim 5, wherein the flange of the collar is resilient and in snap-fit connection with the second end of the body.

7. The socket accessory of claim 1, wherein the collar is arcuate.

8. The socket accessory of claim 1, wherein the collar is C-shaped.

9. An expandable socket accessory, the accessory comprising:
a body movable between an expanded configuration and a collapsed configuration, the body including a first end and a second end; and
a platform adapted to be removably connected to the second end of the body, the platform including a side opening sized to slidably receive at least a portion of the second end of the body;
wherein the body is slidable relative to the side opening between a locked configuration, in which the body is connected to the platform, and an unlocked configuration, in which the body is disconnected from the platform;
wherein the body further comprises a hub removably coupled to the second end, the hub comprising a radially extending tab residing within the side opening of the platform when the body is in the locked configuration.

10. The socket accessory of claim 9, wherein the platform includes a top surface, a bottom surface, and a collar extending axially away from the top surface, wherein the side opening is formed in the collar.

11. The socket accessory of claim 9, wherein the platform includes an inner radial surface sized to engage the second end of the body when the body is in the locked configuration.

12. The socket accessory of claim 9, wherein the tab of the hub includes an aperture and a protruding member extending into the aperture, the protruding member disposed within an annular groove formed in the second end of the body.

13. The socket accessory of claim 9, wherein the platform further comprises an inwardly extending detent engaging the tab of the hub to further assist with retaining the second end of the body and the platform in connection.

14. An expandable socket adapted to connect to a platform, the socket comprising:
a body including a first end, a second end, and a longitudinal axis, the second end including a hub, a shoulder, a tip, and a wall extending axially away from the shoulder relative to the longitudinal axis, the hub including a radially extending tab removably disposed around the wall;
wherein the body is movable on the longitudinal axis between an expanded configuration and a collapsed configuration;
wherein the body includes a groove disposed between the wall and the tip, and the tab of the hub includes a protruding member in snap-fit connection with the groove of the body.

15. The expandable socket of claim 14, wherein the groove of the body is an annular groove, and the protruding member is an annular ring within the annular groove of the body.

16. The expandable socket of claim 14, wherein the hub includes a grip adjacent to a portion of the wall of the second end of the body.

17. The expandable socket of claim 14, further comprising a button removably attached to the first end of the body.

* * * * *